United States Patent [19]

Maruscak et al.

[11] 3,800,097

[45] Mar. 26, 1974

[54] BUS SYSTEM FOR INTERCONNECTING SYSTEMS OF A COMMUNICATION SWITCHING SYSTEM

[75] Inventors: John Maruscak; Sanat K. Roy, both of Brockville, Ontario, Canada

[73] Assignee: GTE Automatic Electric Laboratories Incorporated, Northlake, Ill.

[22] Filed: Sept. 15, 1972

[21] Appl. No.: 289,501

Related U.S. Application Data

[63] Continuation-in-part of Ser. No. 255,485, May 22, 1972.

[52] U.S. Cl. .................... 179/98, 317/101 C
[51] Int. Cl. .................... H04q 1/02
[58] Field of Search .................... 179/98, 91 R, 1 PC; 317/101 C

[56] References Cited

UNITED STATES PATENTS

| | | | |
|---|---|---|---|
| 3,462,558 | 8/1969 | Selz | 179/98 |
| 3,610,836 | 10/1971 | Kimura et al. | 179/98 |

*Primary Examiner*—Thomas W. Brown
*Attorney, Agent, or Firm*—Bernard E. Franz

[57] ABSTRACT

A bus system arranged such that the number of interconnection points between subsystems or modules are substantially reduced so that interfacing costs likewise are reduced. The multiple for continuing the bus is located on an interface connector assembly which provides an interfacing between the bus cable and the subsystem or module, so that the continuity of the bus can be maintained, regardless of the system status of any subsystem or subsystems. Normally, with other similar bus systems, the continuity of the bus is disrupted if a subsystem is taken out of service. Furthermore, unlike many other bus systems, the bus can be extended in vertical and/or horizontal directions. The bus system also is such that the bus can be easily terminated by simply inserting a terminator card on the interface connector assembly, or it can be extended by withdrawing the terminator card and plugging in a bus jumper cable with a terminator card at the last module.

5 Claims, 11 Drawing Figures

PATENTED MAR 26 1974 3,800,097

SHEET 2 OF 3

BUS SYSTEM FOR INTERCONNECTING SYSTEMS OF A COMMUNICATION SWITCHING SYSTEM

CROSS REFERENCE TO RELATED APPLICATIONS

This application is a continuation-in-part of U.S. Pat. application, Ser. No. 255,485, filed May 22, 1972, by Robert A. Borbas et al., entitled "Communication Switching System with Modular Organization and Bus."

BACKGROUND OF THE INVENTION

FIELD OF THE INVENTION

This invention relates to an improved method and bus system for interconnecting subsystems of a communication switching system.

In the above-mentioned co-pending application, there is disclosed a communication switching system which is, in part, constructed using a family of mutually compatible modular subsystems. These subsystems can be added and interconnected to satisfy the system requirements. The interconnections of the subsystems are established by means of a bus, with duplicated bus configurations being provided, for reliability.

The present invention relates to the bus system and the method used in the disclosed communication switching system, the system and method being such that the number of interconnection points between the subsystems or modules are substantially reduced so that interfacing costs are likewise reduced.

The subsystem is unique in several respects, including the fact that the multiple for continuing the bus is located on an interface connector assembly which provides an interfacing between the bus cable and the subsystem or module, so that the continuity of the bus can be maintained, regardless of the system status of any subsystem or subsystems. Normally, with other similar bus systems, the continuity of the bus is disrupted if a subsystem is taken out of service. Furthermore, unlike many other bus systems, the bus can be extended in vertical and/or horizontal directions. The bus system also is such that the bus can be easily terminated by simply inserting a terminator card on the interface connector assembly, or it can be extended by withdrawing the terminator card and plugging in a bus jumper cable with a terminator card at the last module.

Accordingly, it is an object of the present invention to provide an improved method and bus system for interconnecting subsystems of a communication switching system.

BRIEF DESCRIPTION OF THE DRAWINGS

For a fuller understanding of the nature and objects of the invention, reference should be had to the following detailed description taken in connection with the accompanying drawings, in which.

Similar reference characters refer to similar parts throughout the several views of the drawings.

DETAILED DESCRIPTION

Figure 1:
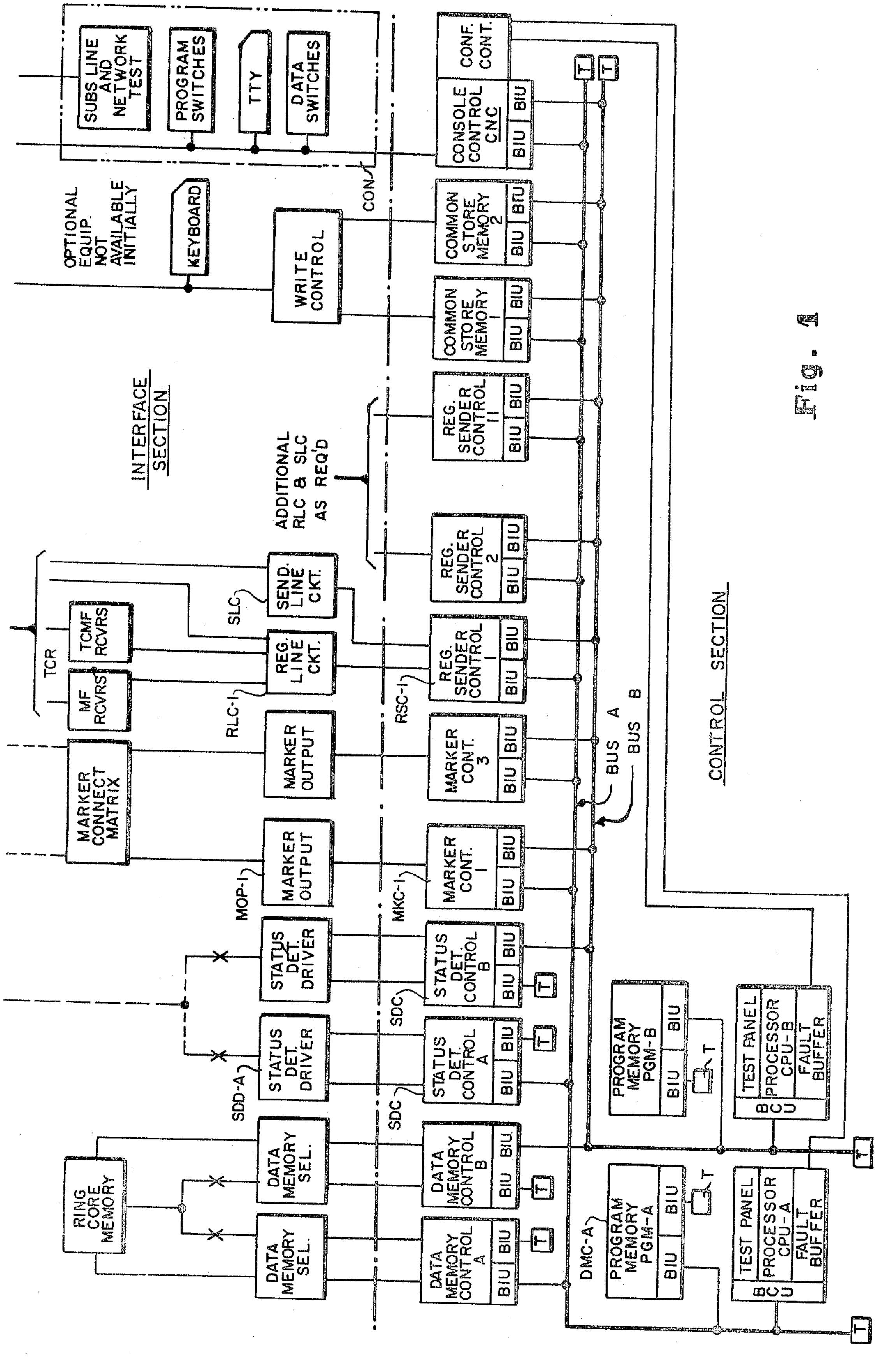
FIG. 1 is a block diagram schematic of the interface and control sections of a communication switching system.

Referring now to the drawings, in FIG. 1 there is illustrated the control and interface sections of the communication switching system disclosed in the above-mentioned copending U.S. Pat. application, Ser. No. 255,485. The control section is of a modular organization, employing a family of mutually compatible modular subsystems, such as the data memory control, the status detector control, a marker control, to mention but a few of the various different ones of the subsystems. The subsystems or modules are interconnected, in duplicate, by means of two data bus systems, the bus A and the bus B.

As to the operation of the communication system per se, reference may be made to this co-pending application. As to the bus system, however, generally each of the buses is a high speed, two-way DC bus linking all subsystems and contains 20 address/data lines and six control lines. It connects the subsystems in a "daisy chain" pattern via bus interface connector assemblies 10 at the rear of each control module. In order to maximize speed and provide high noise immunity, the bus is terminated at each end by a plug-in terminator card T. The bus may be extended at any time by removing the terminator card T, plugging on a short bus extension, and replacing the terminator card at the end of the bus.

The bus is controlled by a bus control unit (BCU) card in the processor module. Up to 19 other modules are connected to the bus via the bus interface connector assemblies 10, with each being interfaced to the bus through a standard bus interface unit (BIU) card in the module. There are no restrictions on the mixture of modules on the bus or on the order in which they are connected. A bus cycle is initiated from the BCU. The identity of the selected module is placed on the bus in bits 1–8. Bits 9–20 may be used for additional data, commands, etc. The selected BIU responds with an acknowledgement signal. The BCU then generates further control signals to command the BIU to either accept data from the BCU via the bus or to place data on the bus for the BCU. The complete cycle takes 1–8 microseconds maximum, plus the operating time of the device itself.

Figure 2:
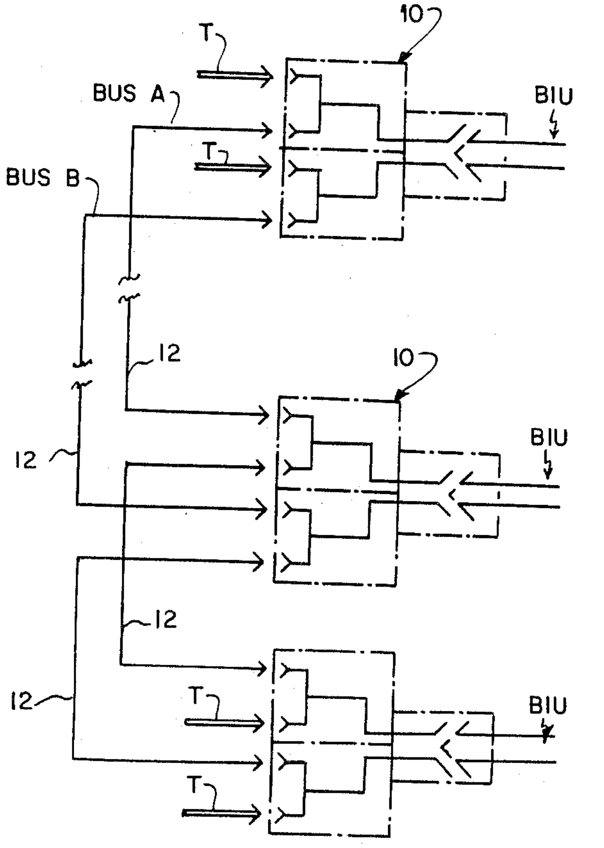
FIG. 2 is a schematic type representation of the bus system.
Figure 5:
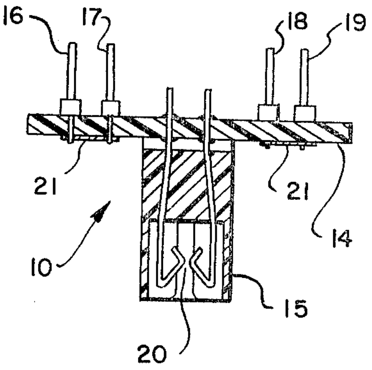
FIGS. 3, 4 and 5 are top, end and side views, respectively, of the bus interface connector assembly.
Figures 6, 7:
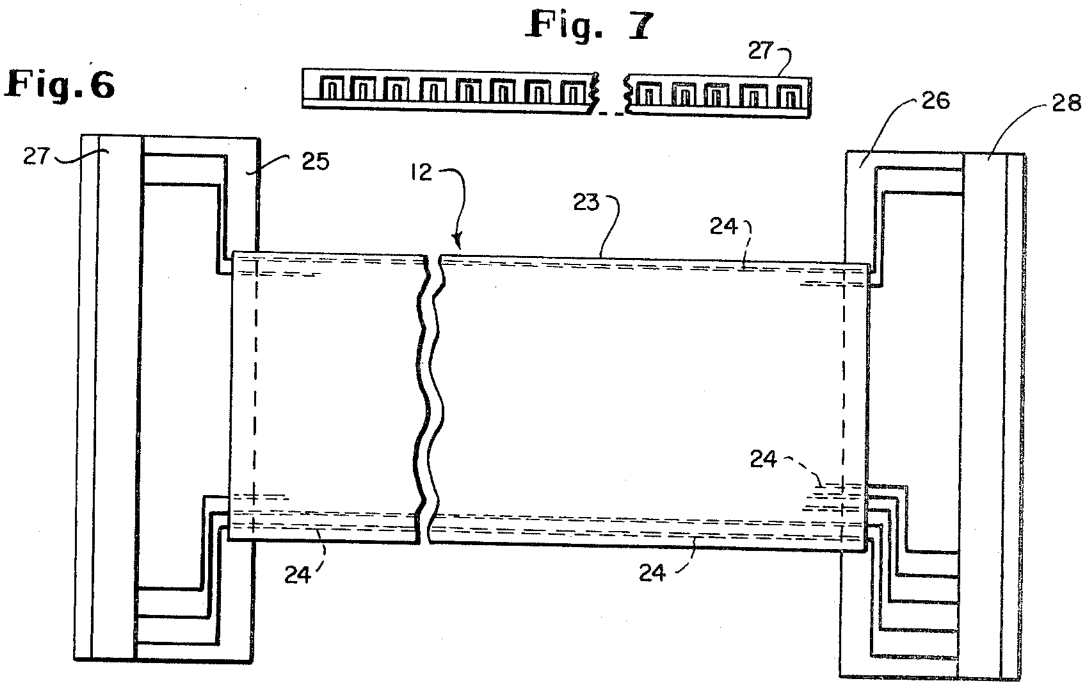
FIGS. 6 and 7 are views generally illustrating the construction of the flexible bus cable.

More particularly, the bus systems A and B each can be said to include a terminator card T (FIGS. 2 and 8–10), a bus interface connector assembly 10 (FIGS. 2 and 3–5), and a bus cable 12 (FIGS. 2, 6 and 7). As generally illustrated in FIG. 2, the interface connector assemblies 10 provide the interfacing between the bus cable 12 and a BIU card of the subsystems, and furthermore, are adapted to receive the terminator cards T for terminating a bus, as more fully described below. Since each bus system is of an identical construction, the description below is applicable to both.

Figure 3:
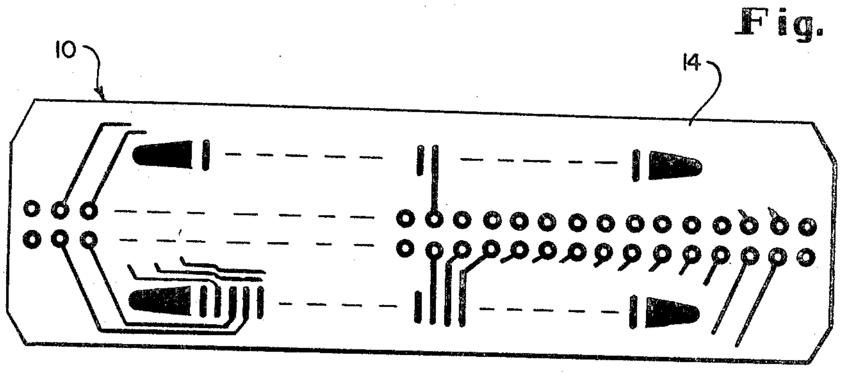
Figure 4:
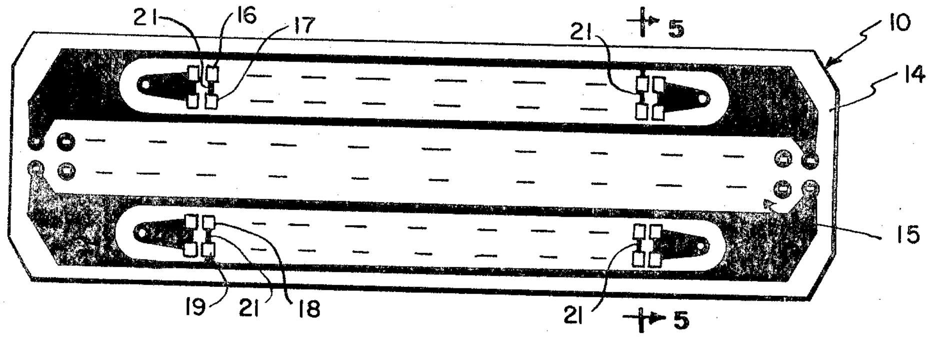

The interface connector assemblies 10, as can be best seen in FIGS. 3–5, include a double-sided printed wiring card 14 having a pin connector 15 mounted on one of its two sides, and four pin arrays 16–19 mounted on the opposite side thereof. In the illustrated embodiment, the pin connector 15 is a standard 56 pin connector and each of the pin arrays 16–19 is a standard 33 pin array.

The pin connector 15 is adapted to receive therein one of the BIU cards. These BIU cards are double-sided cards having duplicate printed wire circuitry on each of the opposite sides thereof and components on one side thereof only. When plugged in the pin connector 15, the latter's pin contacts 20 establish the appropriate contacts with the circuitry on the respective sides thereof. These pin contacts 20 are coupled by the printed wiring on the printed wiring card 14, to respective ones of the pins of the pin arrays 16, 17 or 18, 19, respectively. The pins of the pin arrays 16 and 17 are connected together in corresponding pairs, by means of a jumper 21 which may be, for example, a solder connection. The pins of the pin arrays 18 and 19 are coupled in a corresponding fashion. Accordingly, an electrical connection can be established with the circuitry on the BIU card, by means of a connection through either the pin array 16 or 17, or the pin array 18 or 19. Furthermore, with this arrangement, it can be seen that the continuity of the bus A or B coupled to the pin arrays 16–19 is not broken when the BIU card is removed, since the continuity is maintained by the jumpers 21 connecting the pin arrays 16 and 17, and 18 and 19.

The bus cable 12, as can be best seen in FIGS. 6 and 7, consists of a length of flat, flexible plastic cable 23 having encased therein a number of paired wires 24 (in the illustrated embodiment, 28 paired wires), duplicated for reliability, with a printed wiring card 25 and 26 on each of its opposite ends. A pin connector 27 and 28 is affixed to the printed wiring cards 25 and 26, respectively, and these pin connectors 27 and 28 are adapted to couple with the pin arrays 16–19. The paired wires of the bus cable 12 are coupled to the pin connectors 27 and 28 via the printed wiring on the printed wiring cards 25 and 26. The bus cables 12 are conveniently provided in appropriate lengths to span from one module to another, to connect them together.

Figure 8:
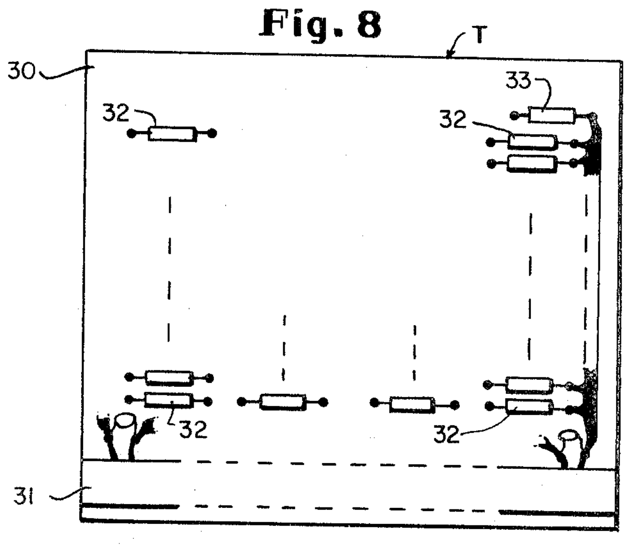
FIGS. 8, 9 and 10 are front, side and rear views, respectively of the terminator card.
Figure 9:
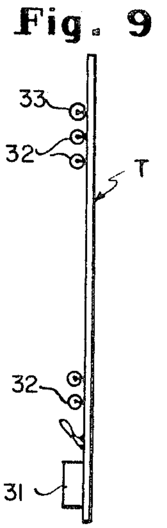
Figure 10:
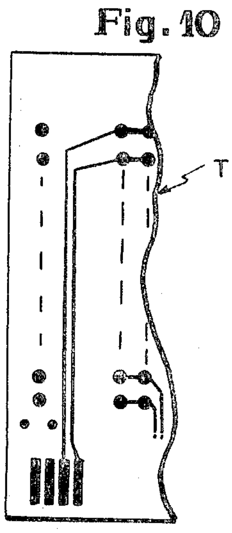

The terminator cards T, as can be best seen in FIGS. 8–10, are each formed of a printed wiring card 30 having a pin connector 31 affixed to it, for coupling or connecting the terminator card T to one of the pin arrays 16–19 on the interface connector assemblies 10. Appropriate components such as resistors 32 and capacitors 33 for properly terminating the bus A or B and for providing noise immunity are affixed to the printed wiring card 30 and are coupled to the pin connecter 31 via the printed wiring on it.

In installing or adapting the bus system to the communication switching system, one or more of the interface connector assemblies 10 is affixed to each of the various different ones of the subsystems, preferably at the rear thereof. All of the subsystems are connected to the bus A and/or B via these interface connector assemblies 10, with each subsystem being interfaced to the bus through a bus interface (BIU) card in the subsystem. As indicated above, these BIU cards plug in to the pin connectors 15 on the interface between the subsystems and the bus. Furthermore, while the system status of any one or more of these subsystems may be changed by, for example, removing a BIU card, the continuity of the bus is not discontinued or interrupted because of the fact that the multiple for the bus is located on the interface connector assemblies 10, and not on the BIU cards.

Figure 11:
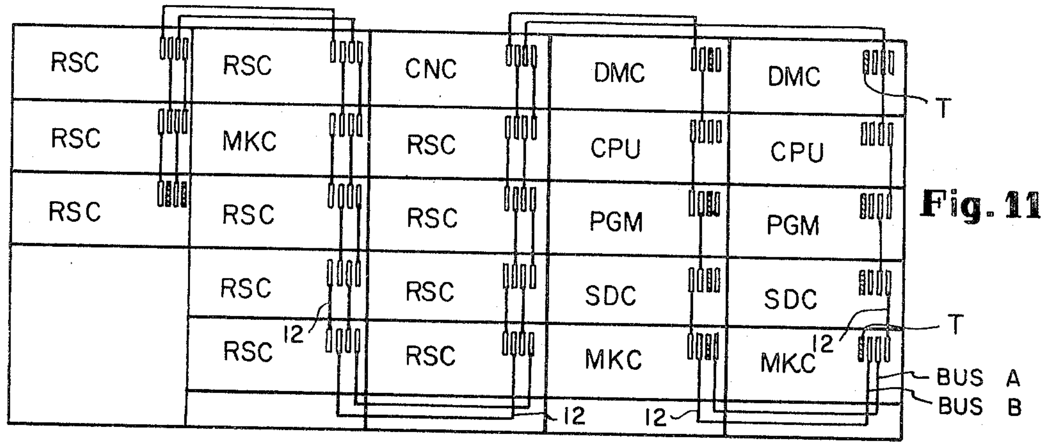
FIG. 11 is a plan view generally illustrating the frame cabling using the bus system of the invention.

With the interface connector assemblies 10 affixed to the subsystems, the latter can be connected together in any appropriate fashion. For example, in FIG. 11 a typical control frame line-up is illustrated, including a number of register sender controls (RSC), Marker Controls (MKC), status detector controls (SDC), console controls (CNC), data memory controls (DMC), program memory controls (PGM) and central processing units (CPU), all in a modular organization. Each of these subsystems, as indicated above, includes a BIU card which plugs into the interface connector assemblies 10, to interface the subsystems to the bus A or B. To interconnect the subsystems, a bus cable 12 is connected between two of the subsystems, by coupling the pin connectors 27 and 28 on the printed wiring cards 25 and 26 on the opposite ends thereof to one of the pin arrays 16 or 17 on the interface connector assembly 10 (not shown in FIG. 11). Thereafter, another cable bus 12 is coupled from the first subsystem to another subsystem, by coupling the pin connector 27 or 28 on one end thereof with the other one of the pin arrays 16 or 17 on the interface control assembly 10 affixed to the first subsystem and coupling the pin connector 27 or 28 on the opposite end thereof with one of the pin arrays 16 or 17 of the interface control assembly 10 on the second subsystem. The continuity of the bus cables 12 is maintained by the jumpers 21 between the pin contacts of the pin arrays 16 and 17. The interconnections between the subsystems are continued from one subsystem to the next in a "daisy-chain" pattern, thus forming the bus A or B. The other one of the two buses A and B is formed by coupling the bus cables 12 between the pin arrays 18 and 19 on the respective interface connector assemblies, thus providing a duplicate bus system. Each of the buses A and B are terminated by coupling the pin connector 31 on the printed wiring card 30 of the terminator cards T with the open one of the pin arrays 16 and 17, or 18 and 19, on the terminal one of the subsystems.

Additional subsystems can be added as system requirements expand, and the buses A and B can be extended by removing the terminator card T, plugging on another bus cable 12, and replacing the terminator card T at the end of the bus. It may be further noted that the bus cable 12 can extend in a vertical and/or a horizontal direction, and can be easily folded to form a bend or corner to extend at a 90° angle to itself. This is possible since the bus cable is of plastic with the paired wires encased within it.

It will thus be seen that the objects set forth above, among those made apparent from the preceding description, are efficiently attained and certain changes may be made in carrying out the above method. Accordingly, it is intended that all matter contained in the above description shall be interpreted as illustrative and not in a limiting sense.

Now that the invention has been described, what is claimed as new and desired to be secured by Letters Patent is:

We claim:

1. A bus system for a communication switching system at least partially formed of a number of mutually compatible modular subsystems each of which includes a bus interface unit card comprising, in combination:

a. a bus formed of a plurality of lengths of bus cable, each said length of bus cable being of a length to extend at least between two of said subsystems and having connector means on each of the opposite ends thereof;

b. an interface connector assembly affixed to each of said subsystems for providing an interfacing between said bus cable and a subsystem, each of said interface connector assemblies having a pin connector on it for receiving and establishing electrical contact with the circuitry of said bus interface unit card to interface said subsystems with said bus and complimentary connector means for coupling with said connector means on said bus cables and a multiple for continuing said bus, whereby the continuity of said bus is maintained regardless of the system status of any of the subsystems; and c. terminator means for terminating each of the terminal ends of said bus.

2. The bus system of claim 1, wherein said terminator means comprises a terminator card having connector means on it complimentary with said connector means on said interface connector assembly which is complimentary with said connector means on said bus cables, the terminal ends of said bus being terminated by affixing said terminator card to the connector assembly on the terminal one of said subsystems.

3. The bus system of claim 1, wherein said interface connector assemblies each further include at least one pair of pin arrays, corresponding ones of said pair of pin arrays being multipled and coupled to an associated one of the pin contacts of said pin connector, said connector means on the opposite ends of said bus cables being formed to couple with said pin arrays, said bus being interconnected to said subsystems by coupling said connector means on the opposite ends of said bus cable with one of said pair of pin arrays on an interface connector assembly on one of said subsystems and one of said pair of pin arrays on an interface connector assembly on another one of said subsystems.

4. The bus system of claim 3, wherein said terminator means comprises a terminator card having connector means on it formed to couple with each of the respective pairs of pin arrays on said interface connector assemblies, the terminal ends of said bus being terminated by affixing said terminator card to the open one of said pair of pin arrays on the terminal one of said subsystems.

5. The bus system of claim 4, wherein said bus interface unit card is a double-sided card having duplicate printed wire circuitry on each of the opposite sides thereof and said pin connector on said interface connector assembly is adapted to receive and establish electrical contact with the circuitry on each of the opposite sides thereof, a second pair of pin arrays on said interface connector assemblies having correspondng ones thereof multipled and coupled to an associated one of another set of pin contacts of said pin connector, said one pair of pin arrays being associated with the circuitry on one side of said bus interface unit card and the other pair of pin arrays being associated with the circuitry on the opposite side thereof, whereby a second duplicate bus can interconnect said subsystems by affixing said bus cables between said other pair of pin arrays.

* * * * *